Nov. 19, 1963     C. J. CASALEGGI     3,111,488
LIQUID FILTER
Filed Nov. 23, 1960
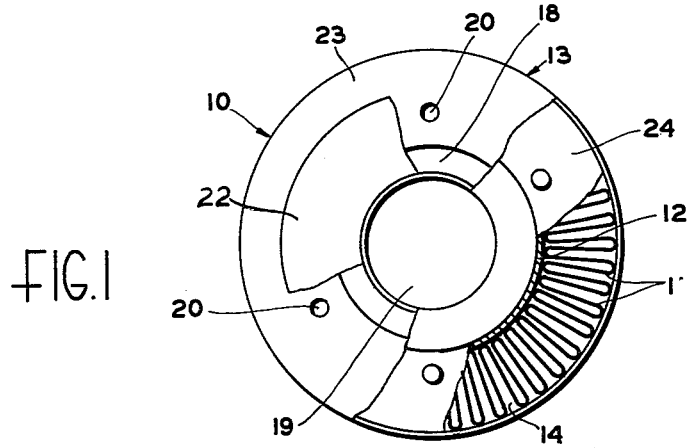
FIG. 1
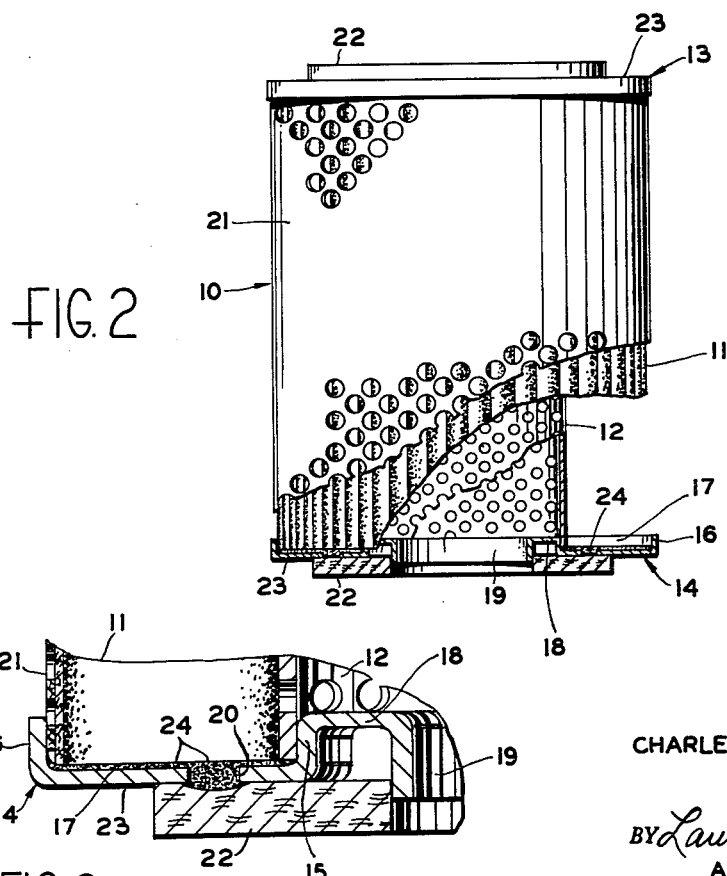
FIG. 2
FIG. 3
CHARLES J. CASALEGGI
*INVENTOR.*
BY Lawrence J. Winter
ATTORNEY

3,111,488
LIQUID FILTER
Charles J. Casaleggi, Middletown, N.J., assignor to Purolator Products, Inc., Rahway, N.J., a corporation of Delaware
Filed Nov. 23, 1960, Ser. No. 71,258
1 Claim. (Cl. 210—232)

The present invention relates to a liquid filter, and more particularly, to a filter in which gaskets are permanently joined to the filter end caps.

In accordance with the present invention, a predetermined length of convoluted paper that has been impregnated with phenol formaldehyde resin is formed into an annular configuration and the free ends of the paper secured to each other by a metal tab, sewing, or the like. The paper annulus is then disposed around a perforated center tube which forms the core of the filter element and a perforated cylindrical body wrapper is disposed around the periphery of the longitudinal pleats to protect them from being damaged. The pleated paper annulus, center tube and body wrapper, known in the art as the "pack," is then inserted in end caps or discs to seal off the opposite edges of the pleats. The end caps comprise annular members having annular troughs filled with a luting cement such as phenol formaldehyde resin. The pack is inserted into the annular trough of each end cap so that when the cement is cured, the pack is permanently sealed to the end cap.

In using the above described filter element in a filter housing or casing, it is generally necessary to use an annular gasket on the outside of the end caps to form a seal with the casing so that the liquid will not by-pass the filter. These gaskets may be of cork, rubber, or plastic material and are bonded to the outside of the end caps by applying luting cement thereto and pressing the gasket against the luting cement, after which the cement is cured and permanently seals the gasket to the end cap.

An object of the present invention is to provide the end caps of an annular pleated paper element with spaced circumferentially disposed apertures therein so that the luting cement is disposed on both sides of the end cap and the annular gaskets may be placed against the outside of the end caps to eliminate the additional step of separately applying a second coat of adhesive to bond the gaskets to the end caps, as used heretofore.

Another object of the present invention is to utilize a single application of luting cement to bond the gaskets to the end caps, and the end caps to the longitudinal edges of the pleats.

Another object of the present invention is to utilize a single application of luting cement to bond the gaskets to the end caps, and the end caps to the longitudinal edges of the pleats.

Another object of the present invention is to provide a pleated paper filter element in which the resin impregnated paper and the luting cement which permanently bonds the end caps to the paper and to the gaskets is cured in the same step in the process of manufacturing.

Various other objects and advantages of the present invention will become readily apparent from the following detailed description when considered in connection with the accompanying drawing forming a part thereof, and in which:

FIG. 1 is a plan view of the filter element of the present invention, partly broken away;

FIG. 2 is a side elevation of the filter element of the present invention, partly broken away; and FIG. 3 is an enlarged detail view of the lower end cap and gasket permanently bonded together.

Referring to the drawings, the reference numeral 10 generally designates an annular resin impregnated pleated paper filter element having a plurality of longitudinally extending pleats 11 disposed about a cylindrical perforated center tube 12 with annular metal end caps or discs 13 and 14. The end caps are identical and comprise a flat portion 23 having inner and outer inturned rims 15 and 16, respectively, which form an annular trough 17. An inturned annular rib 18 is formed in the end cap adjacent the inner periphery thereof, adjacent which is a central opening 19. The flat portion 23 of the end cap is provided with small openings or apertures 20 circumferentially spaced therein.

The pleats are formed into an annular configuration and have the free ends secured to each other by a longitudinally extending metal tab, or they may be sewed together or cemented together if desired. The center tube is inserted centrally into the annular pleated annulus, or the paper annulus is inserted over the center tube to form a filter "pack." Thereafter, a perforated body wrapper 21 having its free ends joined together by sewing or the like, is positioned around the outside of the pleats. It is not necessary to use the body wrapper, but it is preferable, since it protects the pleats from becoming damaged or torn in handling and in transit.

The end cap which is to serve as the lower end cap for the filter pack is positioned with the trough facing upward and an annular gasket 22, preferably of cork material, is placed against the bottom of the end cap with its inner edge seated against the outer side of rib 18 and the outer periphery of the gasket extending beyond the perforations 20 in the end cap. Thereafter, liquid luting cement, such as phenol formaldehyde resin or polyvinyl resin known as Plastisol, is discharged into the trough while gasket 22 is held against the bottom of the end cap. The filter pack is inserted into the trough with center tube 12 disposed adjacent the outer periphery of upturned rim 15 and body wrapper 21 disposed against the inner surface of upturned rim 16 of the cap. Thereafter, the end cap used to seal the other end of the filter pack is filled with luting cement after the cork gasket is placed against the outside of it and the opposite end of the pack is inserted into the end cap in a similar manner. The liquid luting cement will leak through the spaced perforations 20 so that a portion of the cement will form a layer of cement 24, as seen in FIG. 3, between the cork gasket and the outerside of the end cap.

The filter element is then placed on a conveyor belt and passed through a well known curing oven in which the paper and the cement is cured to a solid state to permanently seal the gaskets to the outside of the end caps, and the pleated annulus, center tube and body wrapper to the inside of the end caps to form a filter element.

Thus, the present invention provides a novel filter element in which the annulur end caps are provided with spaced circumferential disposed small openings therein, so that the luting cement which is introduced into the trough-shaped end caps may leak therethrough and form a layer of cement between the gaskets and end caps, thereby eliminating the additional step of separately applying an adhesive cement to the outside of the end caps and adhering the gaskets thereto, as done heretofore. In addition, the invention eliminates the necessity of separately curing the cement bonding material between the end caps and gasket, since it is cured simultaneously with the resin impregnated paper, thereby reducing the time of manufacture of the filter element and the expense thereof. Although spaced circumferential perforations are shown disposed in the end caps, it is appreciated that the perforations could be arcuate slots or the like.

Inasmuch as various changes may be made in the form, location and relative arrangement of the several parts without departing from the essential characteristics of the invention, it will be understood that the invention is not to be limited except by the scope of the appended claim.

What is claimed is:

A filter cartridge including a filter element having a plurality of longitudinally extending pleats formed into an annular configuration and having free ends at least at one end of the element, an end cap for this end of the element and comprising a flat portion on one side of which the free ends of the pleats are located and inner and outer rims extending in the direction of the element and respectively located at least adjacent to the latter's inner and outer peripheries in overlapping relation therewith, and an annular gasket located on the other side of the end cap's flat portion, the end cap having holes formed through its flat portion between its rims and registering with the gasket, and a body of heat curable cement located on the first-named side of the end cap's flat portion throughout its area between its rims with the free ends of the pleats immersed in his body and the cement extending through the end cap's holes and contacting the side of the gasket adjacent to the end cap, this cement body being heat-cured uniformly throughout its extent and adhering to the gasket and the pleats' free ends and the end cap, and sealing the latter and these free ends together and fastening the gasket to the end cap.

References Cited in the file of this patent

UNITED STATES PATENTS

| | | |
|---|---|---|
| 2,427,229 | Riley | Sept. 9, 1947 |
| 2,552,664 | Burdine | May 15, 1951 |
| 2,693,281 | Winzen | Nov. 2, 1954 |
| 2,822,201 | Wood | Feb. 4, 1958 |

FOREIGN PATENTS

| | | |
|---|---|---|
| 727,398 | Great Britain | Mar. 30, 1955 |